(12) United States Patent
Hitchcock et al.

(10) Patent No.: US 10,686,834 B1
(45) Date of Patent: Jun. 16, 2020

(54) INERT PARAMETERS FOR DETECTION OF MALICIOUS ACTIVITY

(71) Applicant: Amazon Technologies, Inc., Seattle, WA (US)

(72) Inventors: Daniel Wade Hitchcock, Bothell, WA (US); Max Harwell Funderburk, Seattle, WA (US); Mathew Persons Jack, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 361 days.

(21) Appl. No.: 15/440,385

(22) Filed: Feb. 23, 2017

(51) Int. Cl.
*H04L 29/06* (2006.01)
*H04L 29/08* (2006.01)
*G06Q 20/40* (2012.01)
*G06N 20/00* (2019.01)

(52) U.S. Cl.
CPC ......... *H04L 63/1466* (2013.01); *G06N 20/00* (2019.01); *G06Q 20/4016* (2013.01); *H04L 63/0281* (2013.01); *H04L 63/1408* (2013.01); *H04L 67/02* (2013.01)

(58) Field of Classification Search
CPC . H04L 63/1466; H04L 63/0281; H04L 67/02; H04L 63/1408
USPC .......................................................... 726/12
See application file for complete search history.

(56) References Cited

U.S. PATENT DOCUMENTS

| | | | | |
|---|---|---|---|---|
| 8,087,082 | B2 * | 12/2011 | Bloch | H04L 29/12066 726/22 |
| 2003/0140140 | A1 * | 7/2003 | Lahtinen | H04L 41/28 709/224 |
| 2010/0332963 | A1 * | 12/2010 | Ellis | G06F 17/3089 715/209 |
| 2011/0078309 | A1 * | 3/2011 | Bloch | H04L 29/12066 709/224 |
| 2014/0280515 | A1 * | 9/2014 | Wei | H04L 67/02 709/203 |
| 2015/0127771 | A1 * | 5/2015 | Bauer-Hermann | H04L 67/22 709/217 |
| 2016/0005029 | A1 | 1/2016 | Ivey et al. | |

OTHER PUBLICATIONS

"Honeypot Processors: Query String Processor" published on Feb. 4, 2015 on https://www.juniper.netidocumentation/en_US/webapp5.6/topics/concepts/w-a-s-honey-pot-processors-query-string.html.

* cited by examiner

*Primary Examiner* — Teshome Hailu
(74) *Attorney, Agent, or Firm* — Thomas | Horstemeyer, LLP

(57) ABSTRACT

Disclosed are various embodiments for detecting malicious activity through the use of inert input parameters to a web service or web page. A service request is received from a client computing device via a service endpoint. A modification is detected to an expected parameter in the service request. The expected parameter is configured to be inert in effect with respect to the service when the expected parameter has not been modified. One or more actions are initiated in response to the modification.

20 Claims, 6 Drawing Sheets

US 10,686,834 B1

INERT PARAMETERS FOR DETECTION OF MALICIOUS ACTIVITY

BACKGROUND

Web services applications programming interfaces (APIs) and web pages use hypertext transfer protocol (HTTP) to transfer data between server and client. In making a web services request or web page request, the client can include parameters corresponding to name-value pairs. The parameters can be the product of form input fields or may be hidden fields used for maintaining state. With an HTTP "GET" request, parameters are encoded in the uniform resource locator (URL) in a portion known as the query string. With an HTTP "POST" request, parameters are encoded in the HTTP message body. Typically, users of web pages do not manually modify parameters, and the values are generated by selecting a hyperlink or filling out a web form.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the use of inert input parameters to web pages or web services in order to detect malicious activity. It is common for malicious users to attempt to compromise services by modifying parameters. The malicious users may seek to overwrite data improperly, gain privileges they are not supposed to have, or view resources that they should not be able to view. For example, if a web page has a uniform resource locator (URL) that includes the parameter "admin=false," a malicious user may seek to change the URL to "admin=true," in hopes of gaining administrative privileges. In addition to modifying existing parameters, malicious users may add a variety of different parameters (e.g., "admin=1") to a URL hoping that it would have some effect. In some cases, the malicious users may delete parameters. The parameter modifications are generally ineffective to provide increased privileges to the malicious users unless the code is poorly designed from a security perspective.

Various embodiments of the present disclosure are configured to utilize parameters with a normal inert effect in order to detect changes in the parameters by malicious users. Parameters that are unnecessary for the operation of the underlying service are added to a resource that is configured to prompt a request for a web page or a web service request. The parameters may be selected so as to be attractive for the malicious user to attempt modification, such as "adminAccess=false." In the normal course, the parameter(s) are passed unmodified in the service request. However, if a malicious user attempts a change (e.g., changing "false" to "true"), various actions may be taken in response, such as logging the attempt, increasing scrutiny for fraudulent activity relative to the client, generating a honeypot environment that mimics heightened privileges to discover more information about the malicious user, blocking network access, and so on.

Although the discussion herein is primarily set in the context of detecting activity by a malicious user, in some cases malicious activity may result from automated processes on a computing device operated by a well-intentioned user. For example, spyware or malware may automatically attempt to change parameter values in the way described herein as being attributed to a malicious user. These changes may be performed unbeknownst to the user of the computing device. The embodiments of the present disclosure therefore are capable of detecting malicious activity driven either by a user or by automated processes. In the following discussion, a general description of the system and its components is provided, followed by a discussion of the operation of the same.

Figure 1:
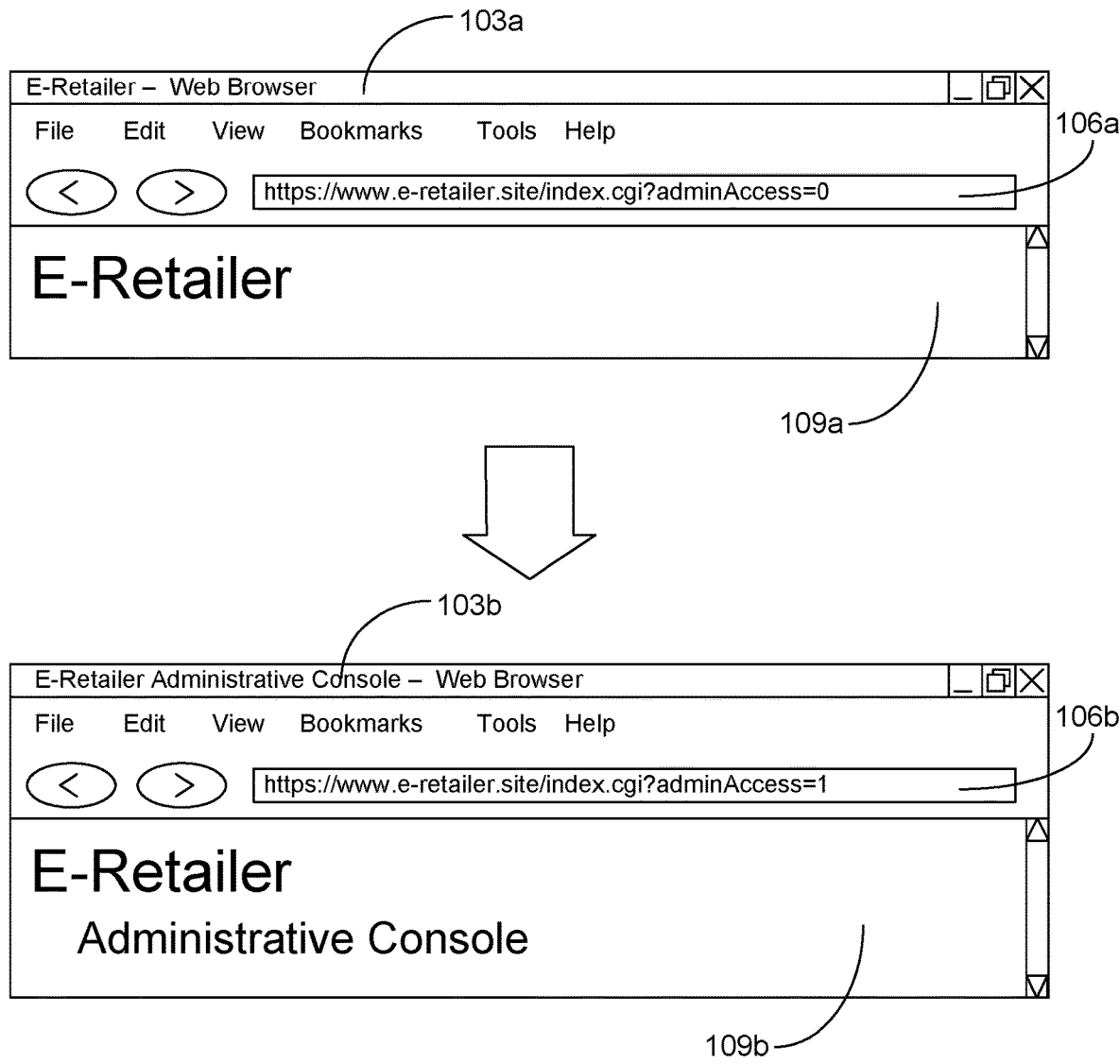
FIG. 1 is a drawing of an example scenario involving detection of parameter modification and a subsequent response according to various embodiments of the present disclosure.

Turning now to FIG. 1, shown is a drawing of an example scenario 100 involving detection of parameter modification and a subsequent response according to various embodiments of the present disclosure. The user interface 103*a* corresponds to a browser in use by a malicious user to access a web site operated by "E-Retailer." The browser has been directed to a URL 106*a* of "https://www.e-retailer.site/index.cgi?adminAccess=0" for a network page 109*a*. The portion of the URL 106*a* that is "adminAccess=0" corresponds to an inert parameter that was included in the URL 106*a* solely for purposes of detecting malicious activity.

Upon seeing this URL 106*a*, the malicious user modifies it, as shown in the user interface 103*b*. The modified URL 106*b* as shown is "https://www.e-retailer.site/index.cgi?adminAccess=1." In the modified URL 106*b*, the value of the inert parameter has been modified from "0" to "1" in attempt to gain administrative privileges. While the parameter is normally inert (i.e., the expected parameter name and value have no functional effect on the web server, and the web server does not rely upon information encoded in the parameter), modification of the parameter may cause various actions to be undertaken. In this particular example, the resulting network page 109*b* purports to be an "administrative console" in order to serve, in effect, as a honeypot. For example, the malicious user may interact with the network page 109*b* and other linked resources, where the interactions are logged and may be used to gain additional information about the malicious user.

In another example, the resulting network page 109b may include a warning notice, such as "Not expecting to see this page? You may have malware on your computer." Such a notice would alert innocent users whose computers may be running malware or spyware that is driving the malicious activity. The network page 109b may include code, or a link to code, that performs a malware scan or reports other parameters back to an administrative service for investigation.

Figure 2:
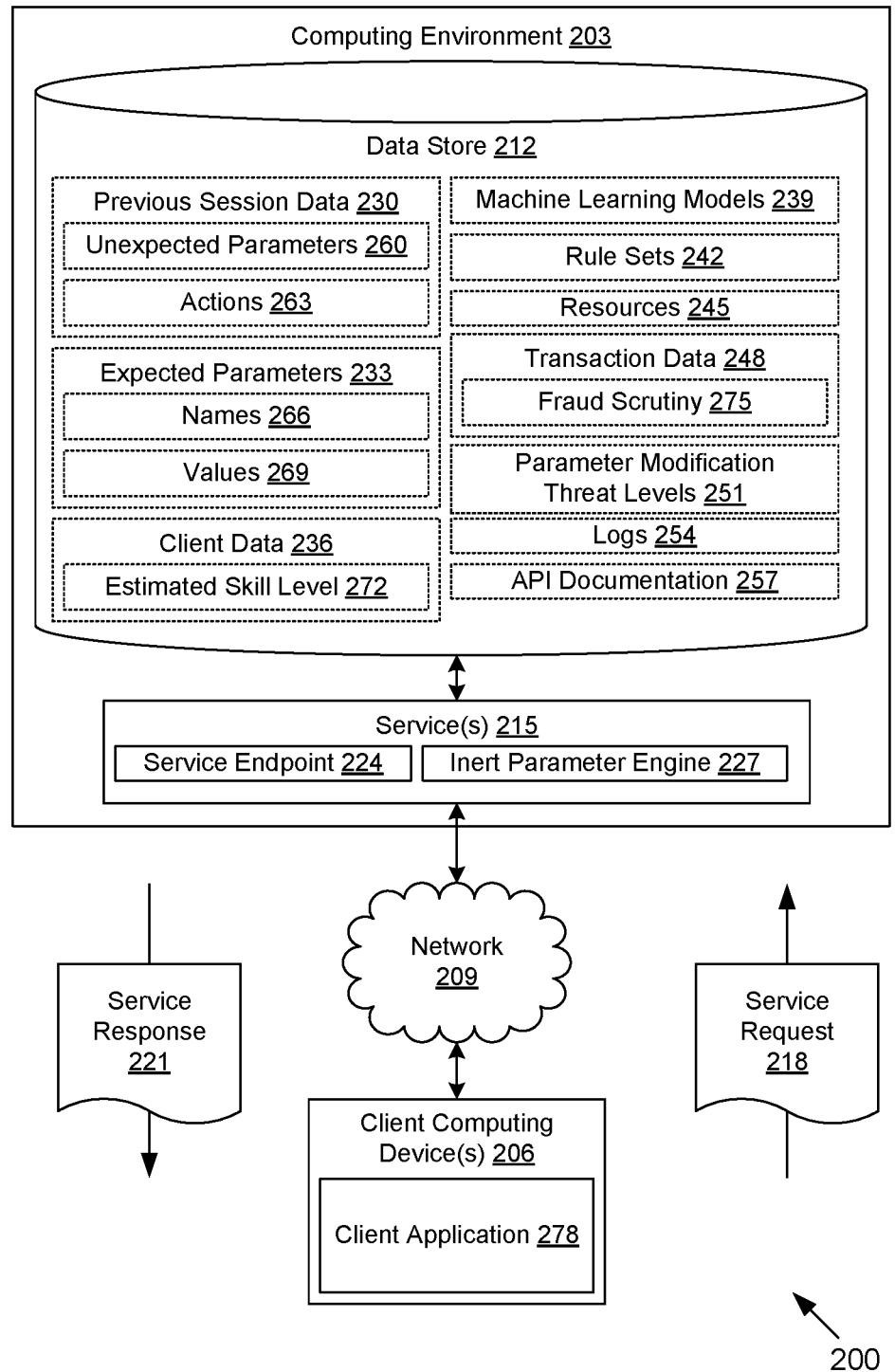
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client computing devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include one or more services 215 and other applications, services, processes, systems, engines, or functionality not discussed in detail herein. The service 215 is executed to receive service requests 218 from client computing devices 206 via the network 209, perform processing, and return service responses 221 back to the client computing devices 206 via the network 209. The service 215 may correspond to a web service or a network content server. The service 215 may utilize hypertext transfer protocol (HTTP), simple object access protocol (SOAP), representational state transfer (REST), and/or other protocols. The service 215 includes one or more service endpoints 224 configured to receive the service requests 218. The service 215 also includes an inert parameter engine 227.

The inert parameter engine 227 is executed to insert inert parameters into resources returned via the service responses 221 and detect modifications to expected inert parameters presented in service requests 218. The parameters are considered inert in that their presence has no practical effect upon the service 215 (other than for the malicious activity detection described herein), nor do they conflict with actual parameter names or values in use by the service 215. Upon detecting unexpected modifications to expected inert parameters, the inert parameter engine 227 may drive the service 215 to perform various actions that may include logging, performing a fraud analysis, providing a honeypot environment, denying access, and/or other actions. In various embodiments, the inert parameter engine 227 may also generate documentation for an application programming interface (API) of the service 215, where the documentation suggests or indicates use of the particular inert parameters.

The data stored in the data store 212 includes, for example, previous session data 230, expected parameters 233, client data 236, machine learning models 239, rule sets 242, resources 245, transaction data 248, parameter modification threat levels 251, logs 254, API documentation 257, and potentially other data. The previous session data 230 records data from previous sessions of a plurality of client computing devices 206 interacting with the service(s) 215. In particular, the previous session data 230 may record unexpected parameters 260 previously provided by the client computing devices 230 as well as actions 263 associated with the unexpected parameters 260 within the respective sessions.

The unexpected parameters 260 correspond to parameter names and/or values that are not expected or utilized by the services 215. The actions 263 can include a variety of observed behavior ranging from innocuous to malicious. Toward the malicious end of the spectrum, the actions 263 can include providing fraudulent credit card numbers, orchestrating a brute force attack on credentials, performing a fraudulent return of merchandise, or other malicious behavior. The information of the previous session data 230 may be analyzed to generate a machine learning model 239 that can be used to select or dynamically generate expected parameters 233 that are inert for purposes of detecting malicious activity. That is to say, unexpected parameters 260 correlated with malicious actions 263 may ultimately be used as expected parameters 233 that may be attractive to malicious users.

The expected parameters 233 correspond to parameters used by the service 215 for detection of malicious activity. The expected parameters 233 may correspond to pairs of names 266 and values 269. The expected parameters 233 may be published in API documentation 257 or may be contained in service responses 221 or other resources 245 so as to configure the client computing devices 206 to provide the expected parameters 233 within the service requests 218. For instance, the expected parameters 233 may be embedded within a uniform resource identifier (URI) or URL for the service endpoint 224 or within a web form as various input fields (which may be hidden fields in some cases). In other examples, the expected parameters 233 may be embedded into cookies, protocol headers, or other data.

The client data 236 associates various data with identifications of client computing devices 206, which can include session identifiers, internet protocol (IP) addresses, cookie information, and so on. In particular, the client data 236 may be associated with an estimated skill level 272. The estimated skill level 272 may be used in order to select or dynamically generate expected parameters 233 that are seeded for the particular client computing device 206. For instance, if the estimated skill level 272 is relatively high, the expected parameters 233 may have increasingly esoteric names 266 or increasingly obfuscated values 269. The estimated skill level 272 may be gauged based at least in part on previous interactions with the client computing device 206, including previous modifications to expected parameters 233. A clustering approach may be used to identify correlations among past parameter modifications and their effects. Where the expected parameters 233 are dynamically generated for a particular client computing device 206, they may be stored in association with the client data 236.

The machine learning models 239 may be created for use in selecting or generating expected parameters 233 and/or performing certain actions in response to detecting particular modifications of expected parameters 233. The machine learning models 239 may be trained based at least in part on the previous session data 230. The machine learning models 239 may also be trained based at least in part on observing the behavior of malicious users in modifying expected parameters 233 and client data 236 associated with the modifications. A goal of the machine learning models 239 may be to separate mere curiosity from malicious behavior. For example, the machine learning models 239 may be trained on what unexpected parameters 260 were detected and which of these are correlated with actions 263 having a likelihood of fraud or abuse in order to dynamically generate expected parameters 233. Ultimately, the machine learning models 239 may generate rule sets 242 for controlling the selection or generation of expected parameters 233 or performing actions in response to modifications of expected parameters 233.

The resources 245 may correspond to static or dynamic resources that may be provided by the service 215 upon request. For example, the resources 245 may correspond to mobile application data, web pages, or other forms of network content. The resources 245 may include hypertext markup language (HTML), extensible markup language (XML), JAVASCRIPT, and/or other data.

The transaction data 248 records various transactions facilitated via client interaction with the service(s) 215. The transactions may include purchases, downloads, rentals, and/or other types. The transactions may be associated with a level of fraud scrutiny 275. As will be described, the level of fraud scrutiny 275 may be increased in view of modifications to expected parameters 233 as the modifications may indicate a lack of trustworthiness of the user. For example, where a user changes an expected parameter 233 of "bypassPayment=false" to "bypassPayment=true," any transaction proposed to be undertaken or consummated via the client computing device 206 may be subject to an additional fraud analysis or increased fraud scrutiny 275.

The parameter modification threat levels 251 record different threat levels associated with different modifications to expected parameters 233. The parameter modification threat levels 251 may be generated manually or through automated operation of the machine learning models 239. For instance, a modification to an expected parameter 233 of "amdin" to "admin" may be considered relatively innocuous compared to a modification to an expected parameter 233 that seems to attempt to take advantage of an unknown exploit.

The logs 254 record modifications to expected parameters 233 for auditing by security administrators and/or use in further developing the machine learning models 239. The logs 254 may include identifying information for the client computing device 206, such as network address (e.g., internet protocol (IP) address), user identifiers, and so on.

The API documentation 257 may correspond to manually created or automatically generated documentation for APIs supported by the services 215. In particular, the API documentation 257 may be crafted to inform malicious users of the existence of parameters correspond to the expected parameters 233, which although described in the API documentation 257, have an inert effect with respect to the purpose or function of the service 215.

For example, the API documentation 257 may indicate expected parameters 233 with an annotation of "reserved for future use" or "deprecated," or with deliberately poor documentation, such that a normal user would not use the expected parameters 233. In some cases, parameter names 266 may be listed, while parameter values 269 may not be, and a use of an unlisted parameter value 269 may be more suspicious than a listed parameter value 269 from the API documentation 257. The API documentation 257 may be generated to state or imply that the use of an expected parameter 233 would convey some special privilege, where the user should not have access to that privilege. The API documentation 257 may be generated to include sample code referencing the expected parameters 233, where the expected parameters 233 appear to be in error, for example, because they are not fully explained.

The client computing device 206 is representative of a plurality of client devices that may be coupled to the network 209. The client computing device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices.

The client computing device 206 may be configured to execute various applications such as a client application 278 and/or other applications. The client application 278 may be executed in a client computing device 206, for example, to access network content served up by the computing environment 203 and/or other servers. To this end, the client application 278 may comprise, for example, a browser, a dedicated application, etc. The client computing device 206 may be configured to execute applications beyond the client application 278 such as, for example, email applications, social networking applications, word processors, spreadsheets, and/or other applications.

Figure 3:
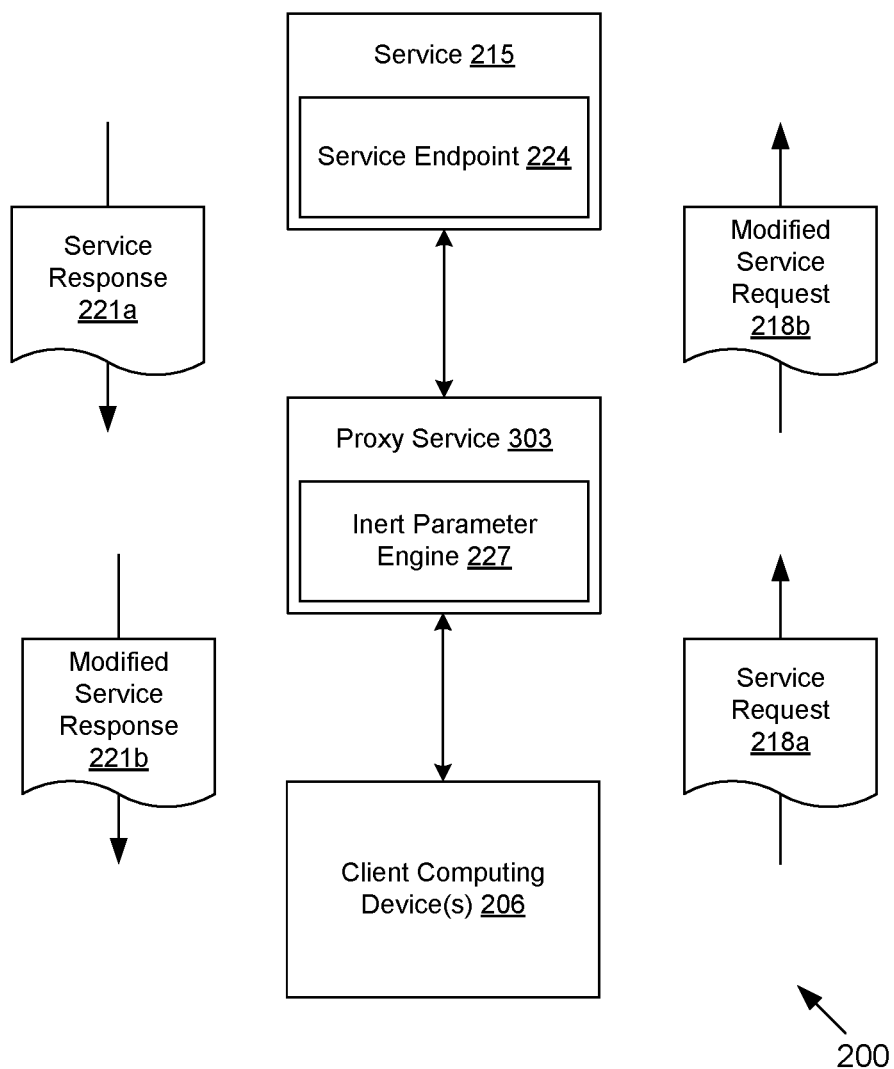
FIG. 3 is a schematic block diagram of an alternative example of the networked environment of FIG. 2 with a proxy service according to various embodiments of the present disclosure.

Referring next to FIG. 3, shown is another example of portions of the networked environment 200 (FIG. 2), where the inert parameter engine 227 is implemented in a proxy service 303. The proxy service 303 may be implemented by the same computing environment 203 (FIG. 2) or by a different computing environment 203. For example, the proxy service 303 may be operated by a third-party service provider that provides malicious activity detection.

The proxy service 303 is interposed on the network 209 (FIG. 2) between the service 215 and the client computing device 206. Thus, the client computing device 206 sends a service request 218a to the proxy service 303 and not directly to the service endpoint 224 of the service 215. The service request 218a includes one or more expected parameters 233 (FIG. 2) that are provided for the purpose of detecting malicious activity by the inert parameter engine 227. The proxy service 303 then strips the expected parameters 233 from the service request 218a and sends the modified service request 218b to the service endpoint 224.

The service 215 processes the modified service request 218b without having to handle the expected parameters 233, thereby returning a service response 221a. The service response 221a is intercepted by the proxy service 303, which then can generate a modified service response 221b. The modified service response 221b can be modified to include callbacks to provide expected parameters 233 (e.g., URLs, form fields) and/or to implement an action in response to the inert parameter engine 227 detecting a modification to the expected parameters 233. Thereafter, the modified service response 221b is returned to the client computing device 206.

Figure 4:
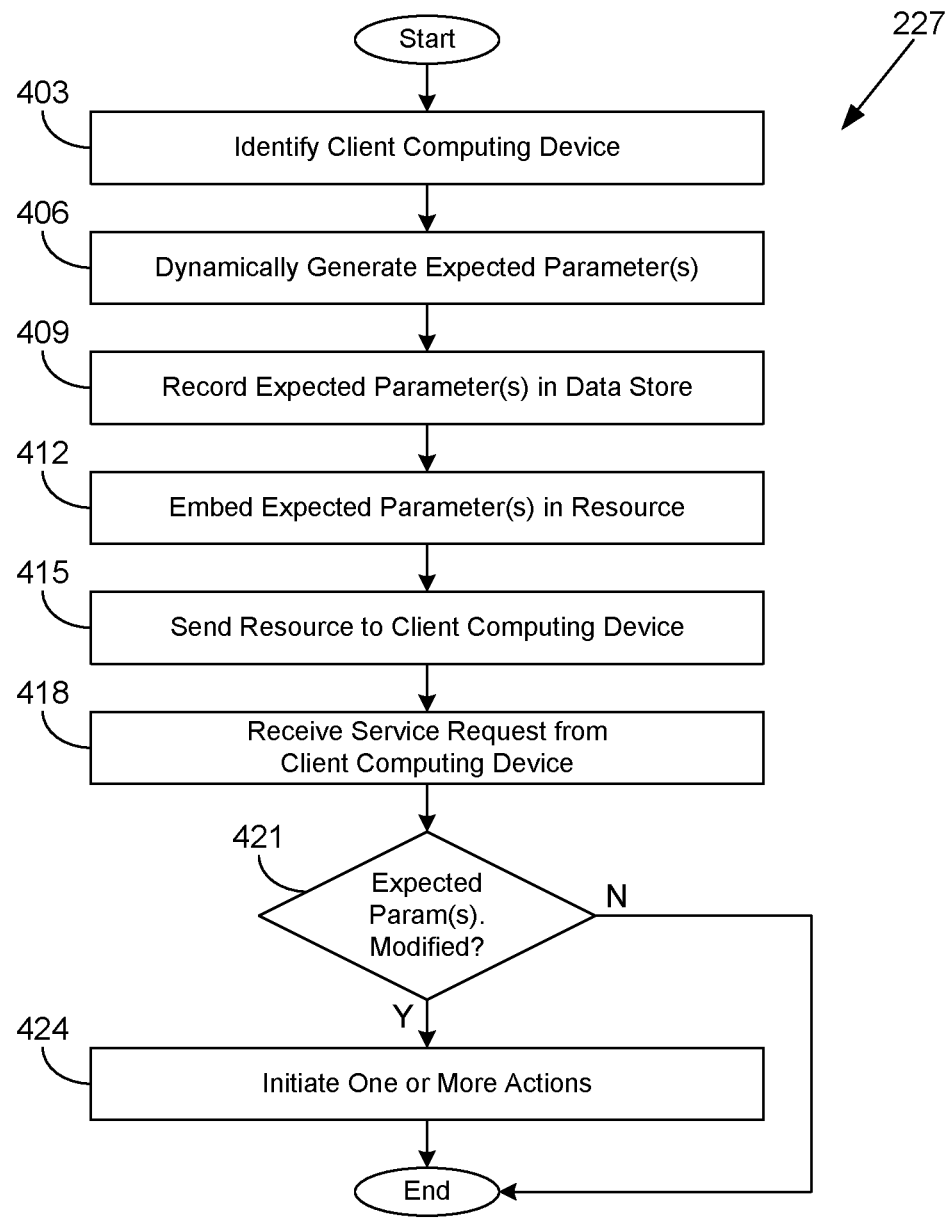
FIG. 4 is a flowchart illustrating one example of functionality implemented as portions of the inert parameter engine executed in a computing environment in the networked environment of FIG. 2 according to various embodiments of the present disclosure.

Referring next to FIG. 4, shown is a flowchart that provides one example of the operation of a portion of the inert parameter engine 227 according to various embodiments. It is understood that the flowchart of FIG. 4 provides merely an example of the many different types of functional arrangements that may be employed to implement the operation of the portion of the inert parameter engine 227 as described herein. As an alternative, the flowchart of FIG. 4 may be viewed as depicting an example of elements of a method implemented in the computing environment 203 (FIG. 2) according to one or more embodiments.

Beginning with box 403, the inert parameter engine 227 identifies a client computing device 206 (FIG. 2) for which inert expected parameters 233 are to be generated. The client computing device 206 may be associated with an estimated skill level 272 (FIG. 2) and/or other characteristics that may affect which expected parameters 233 are selected and/or dynamically generated. The client computing device 206 may have requested to access a resource 245 (FIG. 2) or API documentation 257 (FIG. 2).

In box 406, the inert parameter engine 227 dynamically generates one or more expected parameters 233 by applying a rule set 242 (FIG. 2). In some cases, the expected parameters 233 may be selected from one or more expected parameters 233 that were previously generated or manually specified. Expected parameters 233 may be dynamically generated using an analysis of previous session data 230 (FIG. 2) to determine which unexpected parameters 260 (FIG. 2) were observed previously. The previous unexpected parameters 260 may be correlated to actions 263 (FIG. 2) undertaken by the particular client computing device 206 in order to identify which unexpected parameters 260 resulted in malicious actions 263. These unexpected parameters 260 may be a data source for a machine learning model 239 (FIG. 2) that generates the rule set 242.

The expected parameters 233 are configured to be inert in effect with respect to the service 215 when the expected parameters 233 are not modified. In other words, when the expected parameters 233 are unmodified, the service 215 essentially ignores the expected parameters 233 and does not take the expected parameters 233 into account in responding to the service request. In this regard, the expected parameters 233 may be selected so that the names 266 do not conflict with parameters that are actually used by the service 215. In one embodiment, the parameters that are used by the service 215 may be automatically observed, so that the expected parameters 233 are selected not to conflict with the actual parameters of the service 215. When the expected parameters 233 are modified, the service 215 may provide a different result (e.g., a honeypot environment, a warning notice, loss of network connectivity, and so on), which is a non-inert effect.

As noted, the estimated skill level 272 of the client computing device 206 may be a factor in selecting and/or generating the expected parameters 233. For example, increasingly esoteric parameter names 266 (FIG. 2) (i.e., parameters different from "accessLevel" or other parameters that are obvious for a malicious user to change) may be used for users having increasing estimated skill levels 272. Similarly, parameter values 269 may be obfuscated for users having increasing estimated skill levels 272. For example, a ROT13 translation may be used on a parameter value 269, and an attacker having a higher estimated skill level 272 may recognize the ROT13 translation. The estimated skill level 272 may be gauged through previous interactions or parameter modifications associated with the client computing device 206 and may be used to separate sophisticated attackers from inexperienced users who may tweak a parameter to see where it leads.

In box 409, the inert parameter engine 227 may record the expected parameters 233 in the data store 212 in association with an identification of the client computing device 206. For example, different expected parameters 233 may be generated or selected for different users, and it may be necessary to record which parameters were expected in order to ascertain a modification.

In box 412, the inert parameter engine 227 embeds the expected parameter(s) 233 in a resource 245. This embedding thereby configures the expected parameter 233 for use without modification. For example, the inert parameter engine 227 may embed a callback, such as a URI that encodes the expected parameters 233 or a form with form fields that encode the expected parameters 233. Thus, the resource 245 configures the client computing device 206 to generate a service request 218 including the expected parameters 233 without modification. Alternatively, the inert parameter engine 227 may generate API documentation 257 automatically that describes the expected parameters 233 and a purported use. In box 415, the inert parameter engine 227 sends the resource 245 with the embedded expected parameters 233 to the client computing device 206.

Subsequently, in box 418, the inert parameter engine 227 receives a service request 218 (FIG. 2) from the client computing device 206. In some cases, the malicious user may retrieve the resource 245 in box 415 using one client computing device 206 and then send a service request 218 in box 418 using another client computing device 206.

In box 421, the inert parameter engine 227 detects whether one or more expected parameters 233 have been modified. The modification may correspond to a change to the parameter name 266, a change to the parameter value 269, omitting the parameter value 269, or omitting the parameter entirely. The modification may be analyzed using a machine learning model 239 to determine a parameter modification threat level 251. If no expected parameters 233 have been modified, the inert parameter engine 227 may allow control to pass to the service 215 (FIG. 2), which can then process the service request 218, where the expected parameters 233 have an inert effect on the service 215. Otherwise, if one or more of the expected parameters 233 have been modified, the inert parameter engine 227 continues to box 424 and initiates one or more actions.

The actions that are initiated may range from blocking access to the service 215, generating a network page that permits access to a honeypot environment that mimics having increased access or privilege, logging the event in association with an identification of the client computing device 206, presenting additional security challenges to the client computing devices 206 before granting further privileges or access, prompting a fraud analysis on transactions of the client computing device 206, sending an alert to security administrators by email, text message, phone call, and so forth. The particular action that is chosen may selected from a rule set 242 that is manually specified or generated by a machine learning model 239.

Also, the particular action may depend on the parameter modification threat level 251 ascertained for the observed modification. For example, a simple correction of a misspelling (e.g., "amdin" to "admin") may present a relatively low threat level, warranting increased fraud scrutiny 275 (FIG. 2), while a more complex decoding of an obfuscated value 269 for an esoterically named parameter (e.g., "ogbcbfflnit") may show a greater level of malicious intent and resources, warranting denying access altogether or providing honeypot access to learn more about the malicious user. For example, a honeypot network page may display fake sensitive data and query interfaces configured to induce the suspected malicious user to pursue further actions. These actions could be used to fingerprint attacks for the purpose of expediting detecting of similar attacks in the future. Thereafter, the operation of the portion of the inert parameter engine 227 ends.

Figure 5:
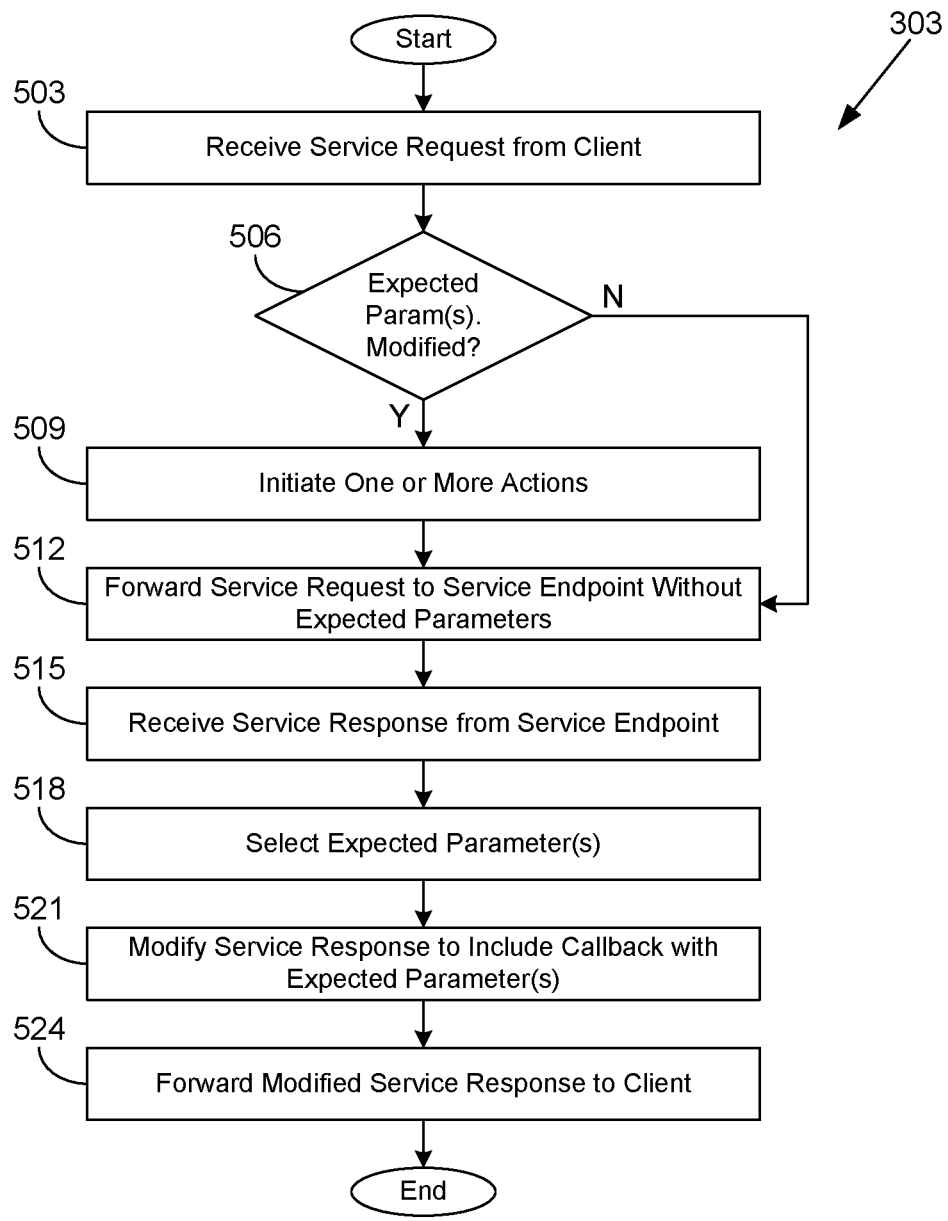
FIG. 5 is a flowchart illustrating one example of functionality implemented as portions of the proxy service executed in a computing environment in the networked environment of FIG. 3 according to various embodiments of the present disclosure.

Moving on to FIG. 5, shown is a flowchart that provides one example of the operation of a portion of the proxy service 303 according to various embodiments. It is understood that the flowchart of FIG. 5 provides merely an example of the many different types of functional arrangements that may be employed to implement the operation of the portion of the proxy service 303 as described herein. As an alternative, the flowchart of FIG. 5 may be viewed as depicting an example of elements of a method implemented in the computing environment 203 (FIG. 2) according to one or more embodiments.

Beginning with box 503, the proxy service 303 receives a service request 218a (FIG. 3) from a client computing device 206 (FIG. 3) via a network 209 (FIG. 2). For example, the proxy service 303 may intercept the service request 218a, which is originally destined for the service endpoint 224. In this regard, the proxy service 303 may comprise a transparent proxy.

In box 506, the proxy service 303 determines whether any expected parameters 233 (FIG. 2) in the service request 218a have been modified. If modified, the proxy service 303 in box 509 initiates one or more actions according to a rule set 242 (FIG. 2). The proxy service 303 continues to box 512, and the proxy service 303 proceeds directly from box 506 to box 512 if no modification occurs. In box 512, the proxy service 303 forwards a modified service request 218b (FIG. 3) to the service endpoint 224 (FIG. 3) via the network 209, where the expected parameters 233 have been removed.

In box 515, the proxy service 303 receives a service response 221a (FIG. 3) from the service endpoint 224 via the network 209. For example, the proxy service 303 may intercept the service response 221a being sent by the service endpoint 224 to the client computing device 206. In box 518, the proxy service 303 selects and/or dynamically generates one or more expected parameters 233. For example, the proxy service 303 may select an expected parameter 233 based at least in part on one or more unexpected parameters 260 previously received from a plurality of different client computing devices 206. Also, the proxy service 303 may automatically observe the actual parameters in use by the service endpoint 224 and then select the expected parameter 233 not to conflict with the actual parameters.

In box 521, the proxy service 303 modifies the service response 221a to include a callback including the expected parameters 233, thereby producing a modified service response 221b (FIG. 3). For example, including the callback may include modifying a URI or form embedded in the service response 221a to include the expected parameter(s) 233 without modification. In box 524, the proxy service 303 forwards the modified service response 221b to the client computing device 206 via the network 209. Thereafter, the operation of the portion of the proxy service 303 ends.

Figure 6:
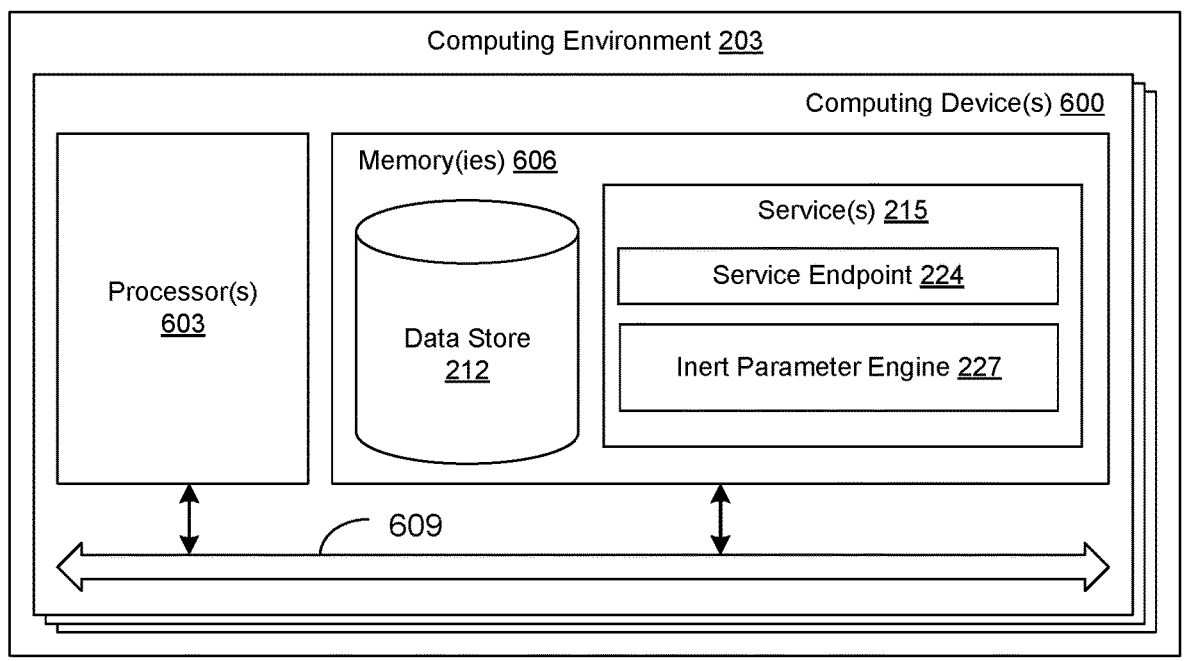
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600.

Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the services 215, including the service endpoint 224 and the inert parameter engine 227, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the services 215, the service endpoints 224, the inert parameter engine 227, the proxy service 303 (FIG. 3), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the inert parameter engine 227 and the proxy service 303. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the services 215, the service endpoints 224, the inert parameter engine 227, and the proxy service 303, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the services 215, the service endpoints 224, the inert parameter engine 227, and the proxy service 303, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a proxy service executable in at least one computing device, wherein when executed the proxy service causes the at least one computing device to at least:
   intercept a resource sent from a service endpoint to a client computing device;
   generate an expected parameter, including a name and a value, based at least in part on at least one unexpected parameter previously received from a plurality of client computing devices, wherein the expected parameter is generated not to conflict with actual parameters observed by the proxy service as being used by the service endpoint;

modify a uniform resource identifier (URI) or a form embedded in the resource to include the expected parameter without modification;

forward the resource as modified to the client computing device;

intercept a service request sent from the client computing device to the service endpoint;

detect an unexpected modification to the expected parameter in the service request;

initiate at least one action in response to the unexpected modification; and forward the service request to the service endpoint without the expected parameter.

2. The non-transitory computer-readable medium of claim 1, wherein initiating the at least one action further comprises initiating a fraud analysis on at least one transaction arising out of a session associated with the client computing device.

3. The non-transitory computer-readable medium of claim 1, wherein when executed the proxy service further causes the at least one computing device to at least generate the expected parameter based at least in part on an estimated skill level associated with the client computing device.

4. A system, comprising:
at least one computing device; and
at least one service executable in the at least one computing device, wherein when executed the at least one service causes the at least one computing device to at least:
send a resource to a client computing device, wherein the resource configures the client computing device to generate a service request including an expected parameter without modification, and the expected parameter is inert in effect with respect to the at least one service when the expected parameter has not been modified;
receive the service request from the client computing device via a service endpoint;
detect an unexpected modification to the expected parameter in the service request; and
initiate at least one action in response to the unexpected modification.

5. The system of claim 4, wherein initiating the at least one action comprises initiating a fraud analysis on at least one transaction arising out of a session associated with the client computing device.

6. The system of claim 4, wherein initiating the at least one action comprises generating a response to the service request based at least in part on the unexpected modification.

7. The system of claim 4, wherein when executed the at least one service further causes the at least one computing device to at least:
generate application programming interface (API) documentation indicating the expected parameter for an API of the service endpoint; and
send data including the API documentation to the client computing device.

8. The system of claim 4, wherein when executed the at least one service further causes the at least one computing device to at least select the expected parameter based at least in part on at least one unexpected parameter previously received from a plurality of client computing devices.

9. The system of claim 4, wherein when executed the at least one service further causes the at least one computing device to at least select the expected parameter so as not to conflict with a plurality of actual parameters in use by the at least one service.

10. The system of claim 4, wherein when executed the at least one service further causes the at least one computing device to at least select the expected parameter based at least in part on an estimated skill level associated with the client computing device.

11. The system of claim 10, wherein when executed the at least one service further causes the at least one computing device to at least determine the estimated skill level according to at least one previous modification to another expected parameter by the client computing device.

12. The system of claim 10, wherein when executed the at least one service further causes the at least one computing device to at least apply an obfuscation to the expected parameter based at least in part on the estimated skill level.

13. The system of claim 4, wherein the resource includes a uniform resource identifier (URI) into which the expected parameter is encoded, and accessing the URI causes the service request to be generated.

14. The system of claim 4, wherein the resource includes a form field into which the expected parameter is encoded, and submitting a form including the form field causes the service request to be generated.

15. The system of claim 4, wherein the unexpected modification to the expected parameter comprises a change to a name of the expected parameter.

16. The system of claim 4, wherein the unexpected modification to the expected parameter comprises a change to a value of the expected parameter.

17. A method, comprising:
dynamically generating, via at least one of one or more computing devices, an expected parameter for a client computing device;
recording, via at least one of the one or more computing devices, the expected parameter in a data store;
embedding, via at least one of the one or more computing devices, the expected parameter that has been dynamically generated in a resource;
sending, via at least one of the one or more computing devices, the resource to the client computing device;
receiving, via at least one of the one or more computing devices, a service request from the client computing device via a service endpoint after the resource is sent to the client computing device;
detecting, via at least one of the one or more computing devices, an unexpected modification to the expected parameter in the service request, wherein the expected parameter is inert in effect with respect to the service endpoint when the expected parameter has not been modified; and
initiating, via at least one of the one or more computing devices, at least one action in response to the unexpected modification.

18. The method of claim 17, further comprising:
analyzing, via at least one of the one or more computing devices, the unexpected modification using a machine learning model to determine a threat level; and
wherein the at least one action is selected based at least in part on the threat level.

19. The method of claim 17, wherein the at least one action comprises logging the unexpected modification in association with an identification of the client computing device.

20. The method of claim 17, further comprising obfuscating, via at least one of the one or more computing devices, a name or a value of the expected parameter that has been dynamically generated.

\* \* \* \* \*